3,061,053
LIQUID COOLED BRAKE
Thomas L. Hibbard, Birmingham, and Charles W. Sinclair, Detroit, Mich., assignors to Kelsey-Hayes Company, Detroit, Mich., a corporation of Delaware
Filed Aug. 25, 1958, Ser. No. 757,028
2 Claims. (Cl. 188—264)

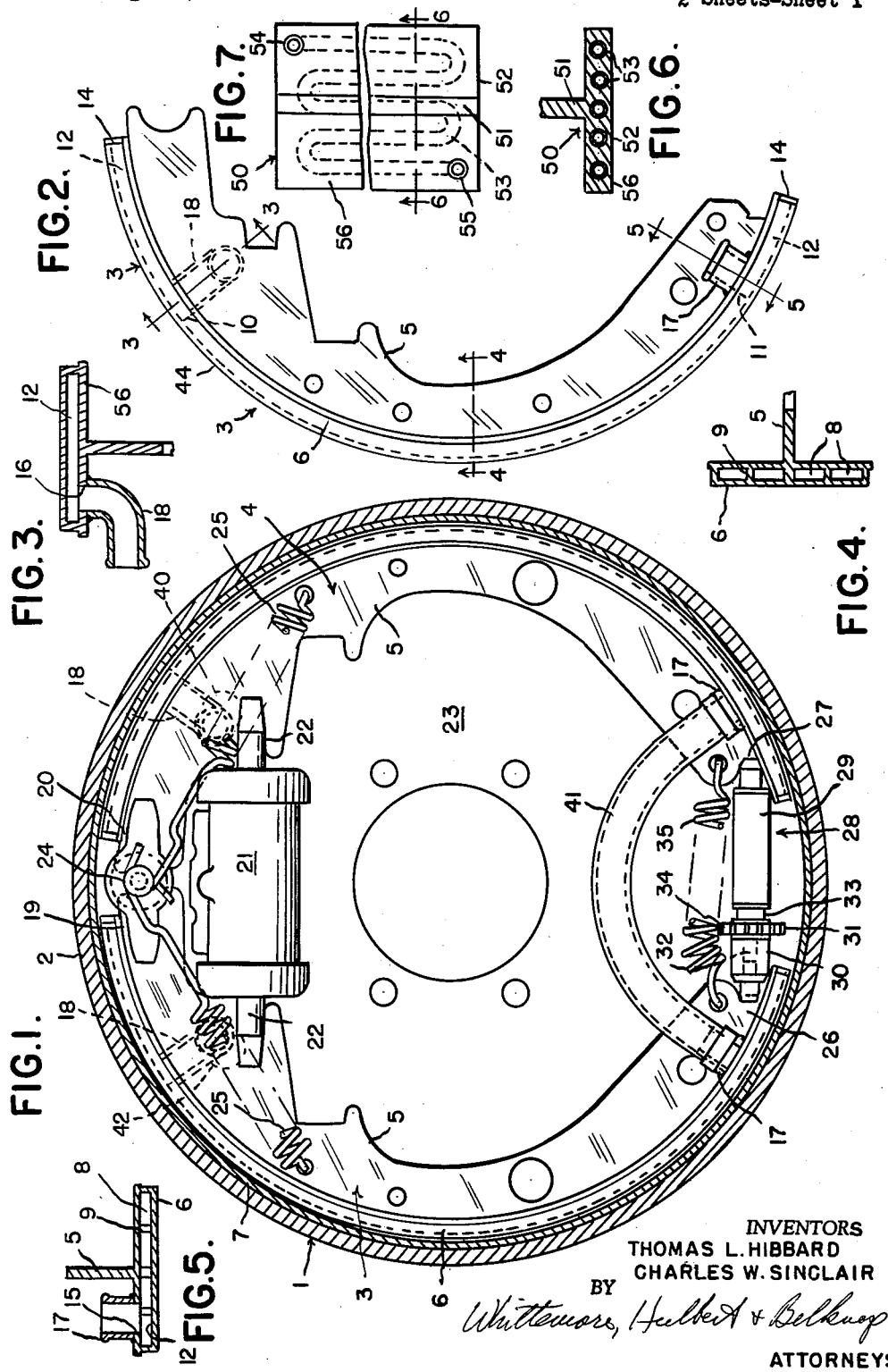

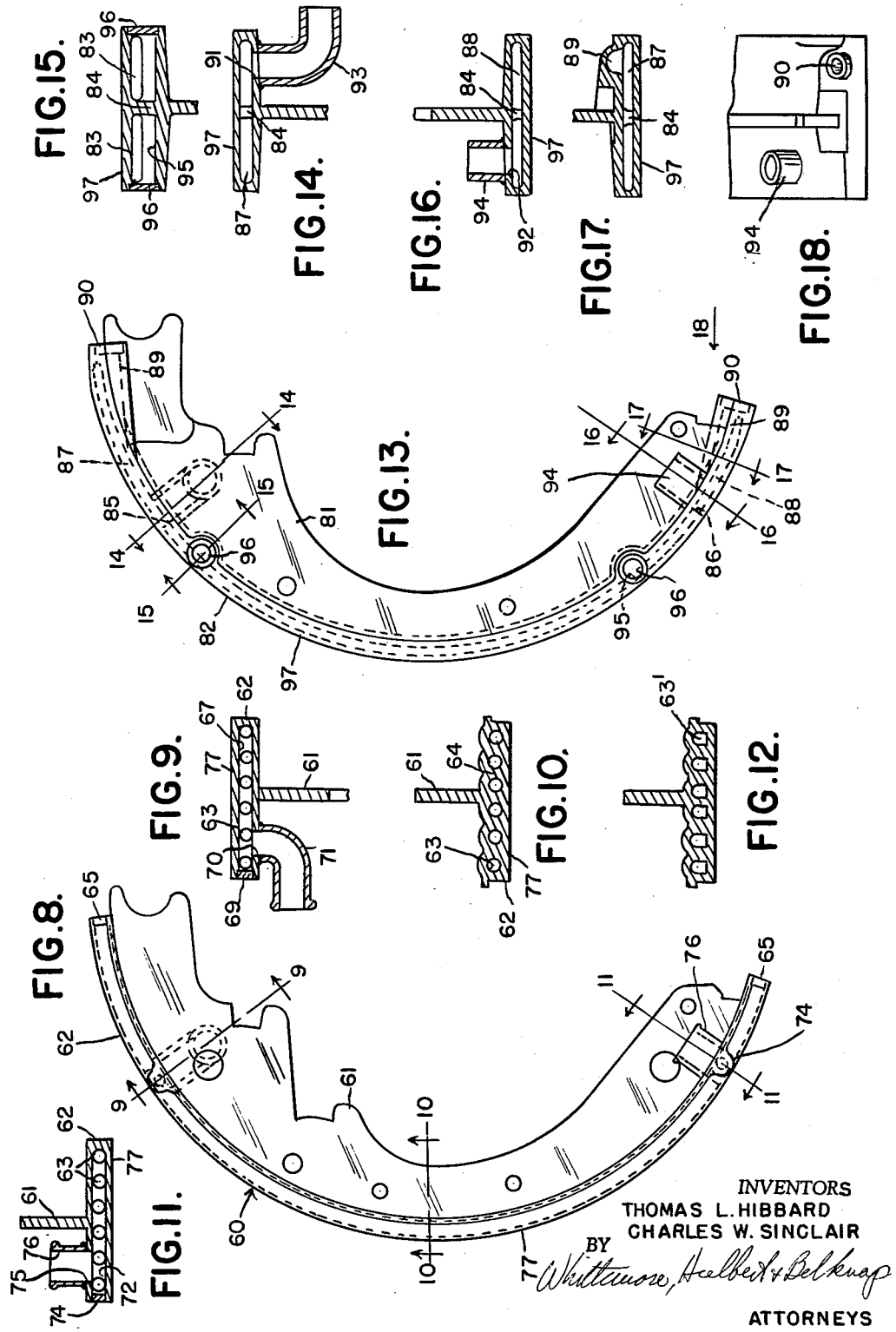

This invention relates to brakes and refers more particularly to vehicle wheel brakes.

The invention has for one of its objects to provide a brake constructed to provide for the circulation of a cooling medium.

The invention has for another object to provide a brake having brake shoes formed with passages for the circulation of a cooling liquid.

The invention has for still another object to provide a brake having brake shoes each formed of a rim and a web cast or extruded in one piece and formed with passages in the rim to provide for the circulation of a cooling liquid adjacent to the braking surface of the shoe.

Other objects and features of the invention will become apparent as the description proceeds, especially when taken in conjunction with the accompanying drawings, illustrating preferred embodiments of the invention, wherein:

FIG. 1 is a side elevation partly in section of a brake embodying the invention.

FIG. 2 is a side elevation of one of the brake shoes shown in FIG. 1.

FIGS. 3, 4 and 5 are sectional views taken on the lines 3—3, 4—4 and 5—5, respectively, of FIG. 2.

FIG. 6 is a sectional view taken on the line 6—6 of FIG. 7 showing a modification.

FIG. 7 is an elevational view of the rim of the shoe shown in FIG. 6.

FIG. 8 is an elevational view of a brake shoe having a modified construction.

FIGS. 9, 10 and 11 are sectional views taken on lines 9—9, 10—10 and 11—11, respectively, of FIG. 8.

FIG. 12 is a sectional view similar to FIG. 10, showing a further modification.

FIG. 13 is a side elevational view of a brake shoe having a further modified construction.

FIGS. 14, 15, 16 and 17 are sectional views taken on the lines 14—14, 15—15, 16—16 and 17—17, respectively, of FIG. 13.

FIG. 18 is a fragmentary elevation of a portion of the shoe shown in FIG. 13, looking in the direction of the arrow 18.

Referring to FIGS. 1-5, the brake is a motor vehicle wheel brake of the type having a brake drum which is secured to and revolvable with the ground engaging wheel of a motor vehicle and also having an internal friction device within and engageable with the annular flange of the drum. The drum 1 has an annular cast iron brake flange 2. The friction device comprises the pair of shoes 3 and 4 preferably formed of aluminum or magnesium or like high heat conductivity material and are mirror images of each other. Each shoe is of T cross-section and is formed by extrusion to provide a radial web 5 and arcuate flange or rim 6 integral with the web and perpendicular thereto. The brake lining 7 is secured to the annular flange 2 of the brake drum for engagement by the rims 6 of the shoes.

The shoe 3 is shown in FIGS. 2-5 wherein it will be seen that the rim of the shoe is formed with the laterally spaced, longitudinally extending parallel passages 8 separated by the walls or partitions 9 which extend from the point 10 to the point 11 adjacent opposite ends of the rim. From the ends of the rim to the points 10 and 11, the rim has the enlarged fluid receiving chambers 12 undivided by partitions but opening into the adjacent ends of the passages 8. The chambers 12 are sealed at the ends of the rim by the plates 14 welded thereto. The rim is drilled to provide ports 15 and 16 communicating with the respective chambers at opposite sides of the web, and nipples 17 and 18 are welded to the rim over the respective ports 15 and 16 for the connection of hoses carrying a suitable liquid coolant.

The shoes 3 and 4 have the separable ends 19 and 20 adapted to be spread apart to move the shoes into engagement with the brake flange lining 7 by a wheel cylinder 21 which has a pair of oppositely acting pistons (not shown) respectively connected to the separable ends 19 and 20 by rods 22. The wheel cylinder is mounted on the backing plate 23 which is adapted to be secured to the axle housing by suitable means such as bolts. One or the other of the shoe ends 19 and 20 anchors on the anchor pin 24 also mounted on the backing plate. Return springs 25 are connected to the anchor pin and to the web of each shoe to normally hold the shoes in the retracted position shown in which the shoes are out of engagement with the brake lining 7 on the drum flange.

The shoes have the other adjacent ends 26 and 27, and the adjustment device 28 extends between ends 26 and 27 for adjusting them relative to each other to take care of wear of the lining 7. The adjustment device comprises the axially aligned members 29 and 30 and the rotatable member 31. The members 29 and 30 have bifurcated ends embracing and abutting recessed portions of the ends of the shoe webs. The rotatable member has the cylindrical pin 32 journaled in a cylindrical socket of member 30, the shank 33 extending into and threadedly engaging the socket of the member 29 and the integral peripherally notched ratchet wheel 34 abutting member 30. The spring 35 has its ends connected to the adjacent ends 26 and 27 of the shoes and an intermediate portion of the spring bears against the ratchet wheel 34 to frictionally maintain the setting of the adjustment device.

The shoe 4 is of the same construction as the shoe 3 except that its nipples 17 and 18 are on the opposite sides of the web. The nipple 18 of the shoe 4 serves as the inlet for the liquid coolant delivered thereto by a hose 40 from any suitable source of supply such as the water pump of a liquid cooled engine of the motor vehicle. The coolant leaves shoe 4 through nipple 17 and is transmitted to shoe 3 through a section of hose 41 connected to the nipples 17 of the shoes. The nipple 18 of shoe 3 provides an outlet for the liquid coolant which is returned to the engine radiator by a hose 42 connected to the nipple. A continuous circulation of cooling liquid is thus provided.

The radially outer surface of the rim of each shoe is adapted to engage the friction lining on the drum flange during an application of the brake, and the heat generated is transmitted through the rim to be dissipated by the liquid coolant circulating through the shoes. As noted above, preferably the integral web and rim of each shoe is formed of a material having relatively high heat conductivity, such as aluminum or magnesium, to increase the speed of heat transfer. The partitions 9 between the passages reinforce and strengthen the construction.

The lining engaging surfaces of the shoe rims may be hardened by anodizing, where aluminum shoes are employed. Anodizing produces a tough adherent relatively thin coating or film 44 of aluminum oxide which not only is hard and wear resistant but resists corrosion. Alternatively, the surfaces of the rims may be metal sprayed likewise to provide a thin film for the purpose of increasing heat conductivity and/or wear resistance. Metals that may be sprayed upon the lining engaging surfaces of the shoe rims are iron, steel, copper and silver, for example. The lining engaging surfaces of the rims may also be plated to enhance their heat conductivity and wear resistance. Suitable plating metals are copper, chrome and silver, for example.

The passages 8 have the illustrated cross section throughout their entire extent and preferably are flat on the side adjacent to the lining engaging surface of the rim for more effective heat transfer. However, it will be understood that the passages may have other cross-sectional shapes such as those illustrated in FIGS. 10, 12 and 16, for example.

FIG. 6 shows a brake shoe having a modified construction. The shoe is indicated at 50 and is a casting having a generally T-shaped cross-section formed by a web 51 and integral arcuate rim 52 perpendicular thereto. A length of tubing 53 is cast into the rim of the shoe and the ends of the tubing are disposed at opposite ends of the rim on opposite sides of the web for connection of nipples 54 and 55 welded to the rim. The tubing has a serpentine configuration within the material of the rim with the straight sections thereof extending longitudinally of the rim. It will be understood that the straight sections of the serpentine tubing may also extend transversely of the rim. The serpentine configuration of the tubing is provided to obtain a maximum cooling effect. The nipples are adapted for connection with delivery and return hoses for liquid coolant. The material of the tubing should have a melting point no less than that of the material from which the shoe is cast so as not to melt during casting. The casting may be of aluminum or magnesium, for example, and the tubing of copper or aluminum, for example. The lining engaging surface of the shoe rim may be metal sprayed or plated with a film 56 if desired, for the same purposes as in FIGS. 1–5, or anodized in the case of an aluminum shoe. The shoe of FIGS. 6 and 7 is intended to be employed in the brake shown in FIG. 1 in conjunction with another shoe of mirror image construction, with the shoes connected to each other and to a liquid coolant source such as the water pump and radiator of the motor vehicle by suitable hosing.

FIGS. 8–11 show a brake shoe having a further modified construction. The shoe is indicated generally at 60 and is a casting having a generally T-shaped cross-section formed by a web 61 and an integral arcuate rim 62 perpendicular thereto. The rim of the shoe is formed with the laterally spaced, longitudinally extending parallel passages 63 separated by the walls or partitions 64 extending from one end of the rim to the other. These passages are cored in the casting operation and are sealed at the ends by the caps 65 of circular cross-section respectively fitting in counterbored recesses at the ends of the passages.

A cross-passage 67 is formed in the rim either by drilling or coring adjacent one end of the rim and the open end of the cross-passage is counterbored to receive a cap 69 for sealing the cross-passage. An inlet port 70 to the cross-passage is either drilled or cored in the rim and a nipple 71 welded thereto.

A second cross-passage 72 is either drilled or cored in the rim adjacent the other end thereof and is counterbored at the open end to receive a cap 74 for sealing the cross-passage. The rim is drilled or cored to provide a port 75 opening into the cross-passage and a nipple 76 is welded to the rim over the port. These cross-passages interconnect the passages 63. The nipples are adapted for connection with delivery and return hoses for liquid coolant. The casting is preferably formed of a high heat conductivity material such as aluminum or magnesium. The lining engaging surface of the shoe rim may be metal sprayed or plated with a film 77 if desired for the same purposes as in FIGS. 1–5 or anodized in the case of an aluminum shoe.

The shoe of FIG. 8 is intended to be employed in the brake shown in FIG. 1 in conjunction with another shoe of mirror image construction, with the shoes connected to each other and to a source of liquid coolant such as the water pump and radiator of the motor vehicle by suitable hosing.

FIG. 12 shows a brake shoe casting which differs from FIGS. 8–11 only in the cross-sectional shape of the passages 63'. The sides of the passages adjacent the lining engaging surface of the shoe rim are flat in order to obtain a maximum rate of heat transfer to the circulating coolant. The shoe passages may have other shapes as desired, for example as in FIG. 4.

FIGS. 13–18 show still another modified construction of brake shoe. The brake shoe there illustrated is of T cross-section and is formed by casting to provide a radial web 81 and arcuate flange or rim 82 integral with the web and perpendicular thereto. The rim of the shoe is formed by coring to provide the laterally spaced, longitudinally extending parallel passages 83 separated by the transverse wall or partition 84 which extends from the point 85 to the point 86 adjacent opposite ends of the rim. Beyond the ends of the partition, the rim of the shoe is cored to provide the enlarged fluid receiving chambers 87 and 88 undivided by a partition but opening into the adjacent ends of the passages. Cored passages 89 connect into the respective chambers and extend to the ends of the shoe rim where they are counterbored to receive a plug 90 sealing the chambers. The rim is drilled or cored to provide ports 91 and 92 communicating with the respective chambers at opposite sides of the web, and nipples 93 and 94 are welded to the rim over the respective ports for connection of hoses carrying a suitable liquid coolant. The cored portions 95 opening through the side edges of the rim are formed by core material required in the casting operation and the open ends are sealed by plugs 96.

The casting consisting of the web and rim is formed of cast iron and the lining engaging surface of the shoe may be metal sprayed or plated with a film 97 of any of the metals referred to above for the same purposes as in FIGS. 1–5.

The shoe of FIGS. 13–18 is intended to be employed in the brake shown in FIG. 1 in conjunction with another shoe of mirror image construction, with the shoes connected to each other and to a source of liquid coolant such as the water pump and radiator of the motor vehicle by suitable hosing.

What we claim as our invention is:

1. In a brake, a brake shoe having a web and a rim, said rim having a surface adapted for engagement with a brake drum, said web and rim being an integral one-piece metal casting having a metal, liquid conveying tube of serpentine configuration embedded and cast in said rim adjacent to said surface, said tube having a melting point greater than said casting metal, said tube having a plurality of elongated, laterally spaced portions extending parallel to one another and lengthwise of said rim, said elongated portions being connected at opposite ends by U-shaped portions of said tube and all of said portions being uniformly spaced from said surface of said rim, said rim having means providing liquid inlet and outlet ports respectively communicating with opposite ends of said tube for circulation of a liquid coolant therethrough.

2. The structure defined in claim 1, wherein said one-piece metal casting is aluminum, and the surface of said rim adapted to engage a brake drum is anodized.

References Cited in the file of this patent

UNITED STATES PATENTS

| | | |
|---|---|---|
| 656,445 | Ekstrom | Aug. 21, 1900 |
| 2,167,551 | Musselman | July 25, 1939 |

(Other references on following page)

UNITED STATES PATENTS

| | | |
|---|---|---|
| 2,195,130 | Hoyt | Mar. 26, 1940 |
| 2,217,001 | Bockius et al. | Oct. 8, 1940 |
| 2,378,516 | Timmerman et al. | June 19, 1945 |
| 2,620,530 | Sulprizio | Dec. 9, 1952 |
| 2,719,438 | Schiefer | Oct. 4, 1955 |
| 2,745,798 | Haueisen et al. | May 15, 1956 |
| 2,775,323 | English | Dec. 25, 1956 |
| 2,797,775 | Burhans | July 2, 1957 |
| 2,815,103 | Foster | Dec. 3, 1957 |
| 2,821,271 | Sanford | Jan. 28, 1958 |
| 2,837,180 | Armstrong | June 3, 1958 |
| 2,844,855 | Gadd et al. | July 29, 1958 |
| 2,851,132 | James | Sept. 9, 1958 |
| 2,986,239 | Sanford | May 30, 1961 |

FOREIGN PATENTS

| | | |
|---|---|---|
| 670,452 | Germany | Jan. 19, 1939 |
| 677,144 | Great Britain | Aug. 13, 1952 |
| 802,800 | France | June 22, 1936 |
| 524,690 | Italy | Apr. 28, 1955 |

OTHER REFERENCES

The Corrosion Handbook, published by John Wiley and Sons, Inc., New York (1948), pages 857–862.